United States Patent [19]

Kijima

[11] Patent Number: 5,125,715
[45] Date of Patent: Jun. 30, 1992

[54] FRONT BODY STRUCTURE OF AUTOMOTICE VEHICLE

[75] Inventor: Mitsutoshi Kijima, Hiroshima, Japan

[73] Assignee: Mazda Motor Corporation, Hiroshima, Japan

[21] Appl. No.: 581,709

[22] Filed: Jul. 14, 1990

[30] Foreign Application Priority Data

Sep. 30, 1989 [JP] Japan .............. 1-115260[U]

[51] Int. Cl.⁵ .............................. B60R 27/00
[52] U.S. Cl. .................. 296/1889; 296/194; 293/132
[58] Field of Search ............ 296/189, 188, 194; 293/132

[56] References Cited

U.S. PATENT DOCUMENTS

| | | |
|---|---|---|
| 4,278,282 | 7/1981 | Roubinet et al. ............ 293/132 |
| 4,408,790 | 10/1983 | Shimoda et al. ............ 293/132 X |
| 4,413,856 | 11/1983 | McMahan et al. ............ 296/189 X |
| 4,469,368 | 9/1984 | Eger ............ 296/188 |
| 4,822,096 | 4/1989 | Fujii ............ 296/194 |
| 4,830,418 | 5/1989 | Gest ............ 293/132 X |
| 4,940,270 | 7/1990 | Yamazaki et al. ............ 293/132 X |

FOREIGN PATENT DOCUMENTS

| | | |
|---|---|---|
| 226012 | 6/1987 | European Pat. Off. . |
| 2457400 | 6/1976 | Fed. Rep. of Germany . |
| 2544713 | 4/1977 | Fed. Rep. of Germany . |
| 89475 | 5/1983 | Japan .................. 296/189 |
| 63-64883 | 3/1988 | Japan . |
| 306986 | 12/1988 | Japan .................. 296/194 |
| 275277 | 11/1989 | Japan .................. 296/194 |
| 99471 | 4/1990 | Japan .................. 296/195 |

Primary Examiner—Margaret A. Focarino
Assistant Examiner—Gary C. Hoge
Attorney, Agent, or Firm—Fleit, Jacobson, Cohn, Price, Holman & Stern

[57] ABSTRACT

A front body of a vehicle has a pair of box shaped kick-down front side frames, which extend in a lengthwise direction, from front to back, of the vehicle, for forming an engine receiving volume. The kick-down front side frame is contituted by a straight front side frame portion and a kick-down frame portion by which the side frame is connected to a floor frame. A reinforcement, placed within the box-shaped kick-down fornt side frame so as to extend across the straight front side frame portion and kick-down frame portion, is provided with a crushable notch, near a transitional portion of the kick-down front side frame located between the straight front side frame portion and kick-down frame portion. The crushable notch allows the kick-down front side frame to be crushed, or bent, at the transitional portion in a desired pattern of deformation during a collision of the vehicle.

5 Claims, 4 Drawing Sheets

FRONT BODY STRUCTURE OF AUTOMOTICE VEHICLE

The present invention relates to part of the body structure of a vehicle and, more particularly, to the front body structure surrounding an engine room, or volume, of a car body.

BACKGROUND OF THE INVENTION

1. Field of the Invention

Typically, the front body portion of a vehicle is provided with frame members, or front side frames, extending in a lengthwise direction of the car body, disposed on opposite sides of an engine room. The front body is further provided with a front bumper, secured to front ends of the front side frames. When the vehicle is subjected to a straight-on, front end collision, an abrupt impact load is exerted on the front bumper. If the abrupt impact load is sufficiently high, it is transmitted to the front side frames. During the occurrence of a collision, the front bumper is compressed, or crushed, by the abrupt, high impact load, and the front side frames are bent. Crushing of the front bumper and bending of the front side frames can efficiently absorb, in combination, the impact load, so that the front body portion and, in particular, a driver and/or passengers in the front compartment of the vehicle are not subjected to a high pressure impact during a collision. This protects the driver and passengers against injury during the occurrence of a collision.

Vehicles of the "short-nose" type, i.e., vehicles of the type having a compact body with an over-hung front body portion which is adapted and designed to be short, are likely to have only a small space for allowing the front body to be crushed upon a collision. In such a short-nose type vehicle, the front side frames, when bending while absorbing a high impact load during the occurrence of a collision, move toward the rear of the car body more than the front side frames of long-nose type vehicles do. From the view point of protecting the driver and passengers in the vehicle, the design of what is termed a "deformation mode" of the front side frames of the front body of a short-nose type vehicle is particularly significant.

2. Description of Related Art

One known type of structure of the front side frame of a short-nose type vehicle has a front side frame comprising a front half of front side frame member, a rear half of front side frame member, which bends down and extends under a floor panel of the passenger compartment of the vehicle, and a gusset smoothly interconnecting the front and rear halves of front side members. The gusset is secured to a junction of reinforcements for the front and rear halves of front side members so as to improve of the strength of the connection between the reinforcements and the resistance to buckling of the front side frame during the occurrence of a collision. Such a front side frame structure is known from, for instance, Japanese Patent Application No. 61-209364, entitled. "Front Frame Structure Of Vehicle," filed on Sep. 4, 1986, and now laid open as Japanese Unexamined Patent Publication No. 63-64883 on Mar. 23, 1988.

In the structure disclosed by this Japanese Publication, a front header, i.e., a top part of a windshield frame, is disposed over the upper edge of the front windshield glass. On the other hand, a lower edge of the front windshield glass is supported or held by a cowl box or cowl panel located over a dash panel used as a partition wall between the engine room and the front passenger compartment of the vehicle. The dash panel is secured, at a lower portion thereof, to the rear ends of the front halves of front side frame members.

Typically, there is caused, during a collision, a physical phenomenon known as "nose dive," which occurs when the vehicle body is forced downwardly during the collision. When such a nose dive occurs, the front header moves down. If the driver and/or passengers have unfastened their safety belts, they will be thrown straight forward, out of their seats, during a head-on collision. The driver and any passengers are, therefore, likely to hit their heads against the front header.

SUMMARY OF THE INVENTION

A primary object of the present invention is to provide a front body structure, surrounding an engine room or volume of a car body, which allows a front side frame to deform in a desired pattern during a collision so as to prevent a front header from moving down.

This object is accomplished by providing a front body structure of a vehicle including a pair of generally box-channel shaped kick-down front side frames for forming the engine room of the front body. Each kick-down front side frame extends in a lengthwise direction, from front to back, of the vehicle, and is constituted by a straight front side frame portion and a kick-down frame portion by which the kick-down front side frame is connected to a floor frame extending in the lengthwise direction. A reinforcement is placed within the box-channel shaped kick-down front side frame so as to extend, in the lengthwise direction, across the straight front side frame portion and kick-down frame portion. The reinforcement is provided with crushable means near a transitional portion of the kick-down front side frame between the straight front side frame portion and the kick-down frame portion. The crushable means has the form of, e.g., a kerf or a notch, and is adapted and designed to allow the kick-down front side frame to be crushed or bent in a desired pattern of deformation at the transitional portion during a collision of the vehicle.

BRIEF DESCRIPTION OF THE DRAWINGS

The above and other objects and features of the present invention will be apparent from the following description of a preferred embodiment thereof when considered in conjunction with the appended drawings, wherein similar reference numerals have been used to designate the same or similar elements throughout the drawings, and in which.

DETAILED DESCRIPTION OF THE PREFERRED EMBODIMENTS

Because, in general, the front body structure of a car body is well known to those skilled in the art, the following description is directed to particular elements forming part of, or cooperating with, the novel structure in accordance with the present invention. It is to be understood that the elements not specifically shown or described can take various forms well known to those skilled in the vehicle art. It is to be noted that the term "inner" in the specification has been used to refer a direction toward the interior, or inside, of the vehicle from the exterior, or outside, of the vehicle.

Figure 1:
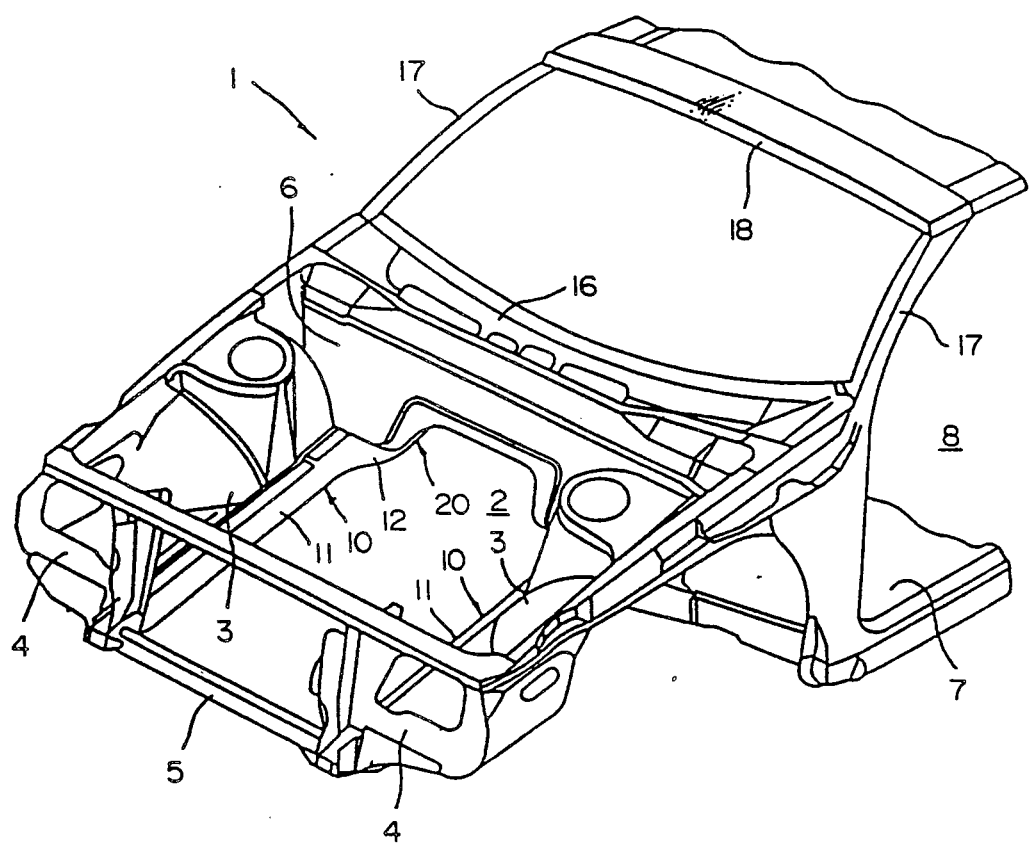
FIG. 1 is a schematic perspective view of a front body structure of a vehicle in accordance with a preferred embodiment of the present invention.

Referring to the drawings in detail, and, in particular, to FIG. 1, details of a right side portion of a front body section, generally designated by a reference numeral 1, are illustrated in a perspective view. The front body section 1 includes a pair of, i.e., right and left, wheel aprons 3 forming an engine room 2 of the vehicle. In the engine room 2, there are a pair of, or right and left, generally box-channel, i.e., hollow, cross-sectionally quadrilateral shaped kick-down front side frames 10, disposed along inner sides of the right and left aprons 3, respectively, and extending, parallel to each other, in a lengthwise direction from front to back of the car body. The front side frames 10 are referred to as "kick-down" frames because of the downwardly curving structure of portions 12 of frames 10, which will be described presently. Each kick-down front side frame 10, at its front end portion, penetrates and projects from a shroud panel 4, constituting part of a front wall of the engine room 2. The kick-down front side frames 10 are interconnected by a front cross member 5, which is welded or otherwise secured to the front ends of the kick-down front side frames 10 projecting from the shroud panels 4.

The kick-down front side frames 10 are secured, at middle points between a front portion, which extends straight back from the front of the vehicle, and a kick-down portion, which descends downward and back from the front portion, to a lower portion of a dash board or panel 6. The dashboard is provided as a partition between the engine room 2 and a front passenger compartment 8. The kick-down front side frames 10 are, respectively, welded or otherwise secured, at their rear ends, to front ends of a pair of, i.e., right and left, floor frames 20. It should be noted that the left side floor frame is hidden in FIG. 1. The floor frames 20 extend over opposite sides, or edges, of a floor panel 7 of the passenger compartment 8 in the lengthwise direction.

Figure 4:
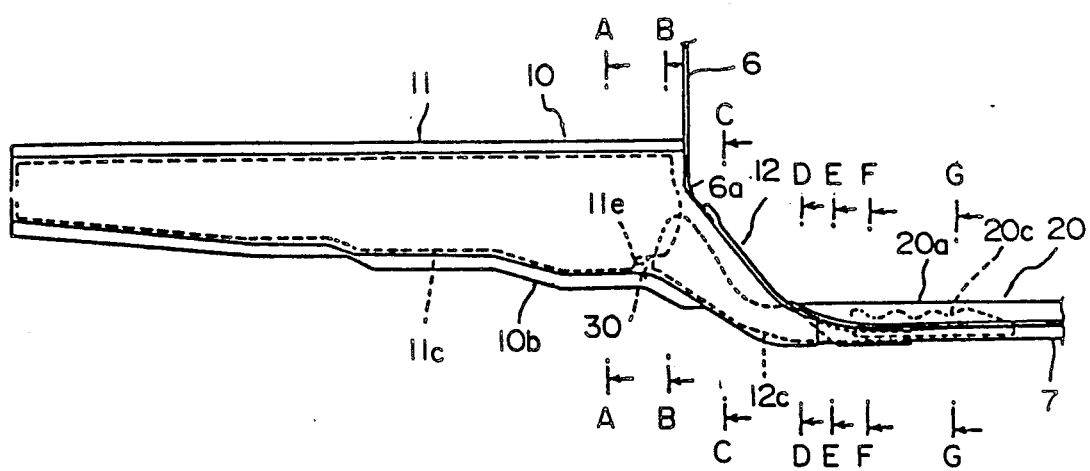
FIG. 4 is a side view of the front side frame, to which a dash panel and a floor frame are attached.

As is shown in detail in FIG. 4, each kick-down front side frame 10 comprises a straight front frame portion 11, descending rearwardly and down. Each straight front frame portion constitutes a front half of a kick-down front side frame 10, and extends rearwardly of the vehicle in the lengthwise direction in a straight line. Each kick-down front side frame further comprises a down-swept or kick-down frame portion 12, constituting a rear half of the kick-down front side frame 10 and gently sloping rearward down from the rear end of the straight front frame portion 11. Each straight front frame portion 11 is connected as an integral unit with one kick-down frame portion 12, as will be described in detail later. The kick-down frame portions 12 are used to interconnect each kick-down front side frame 10 and a floor frame 20 to each other so as to offset the floor frame 20 vertically downward with respect to the engine room 2 of the vehicle relative to the kick-down front side frame 10 and lay the floor frames out parallel to each other. Each of the integral units are formed by one kick-down front side frame 10 and one floor frame 20. Each of the integral units together constitute a front frame structure of the front body section 1.

Referring back to FIG. 1, an upper end portion of the dash panel 6 is secured to a cowl box 16 for supporting a lower edge of a front windshield glass (not shown). On opposite sides of the cowl box 16, the car body is provided with right and left front pillars 17, extending upward. The front pillars 17 are interconnected to each other by a front header 18, extending along and over an upper edge of the front windshield glass and secured to top ends of the front pillars 17.

Figure 2:
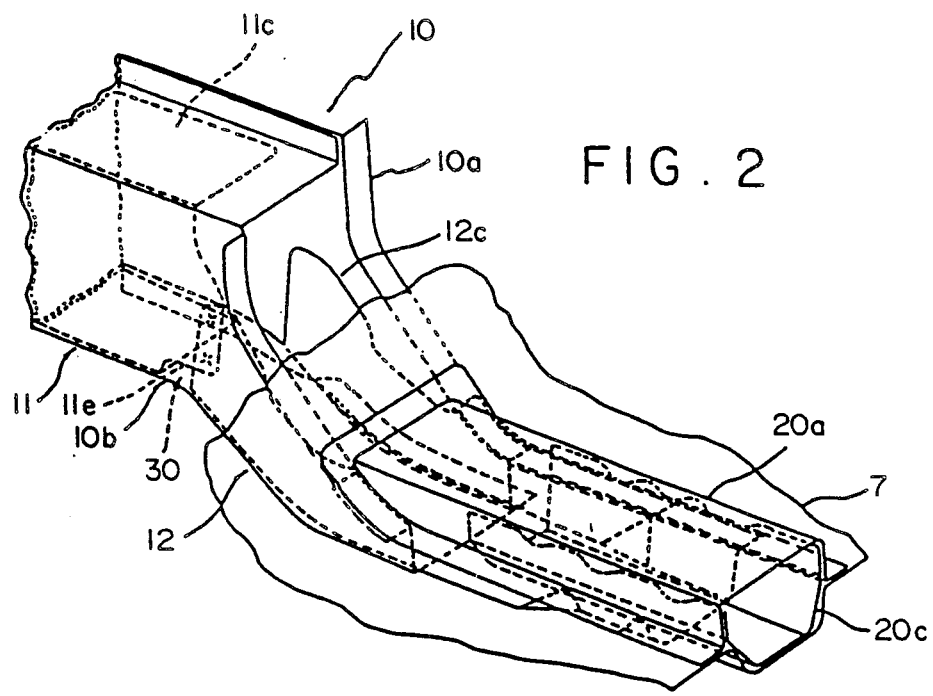
FIG. 2 is a perspective view of a front side frame of the front body structure, partially cut away, to which a floor frame is connected.
Figure 3:
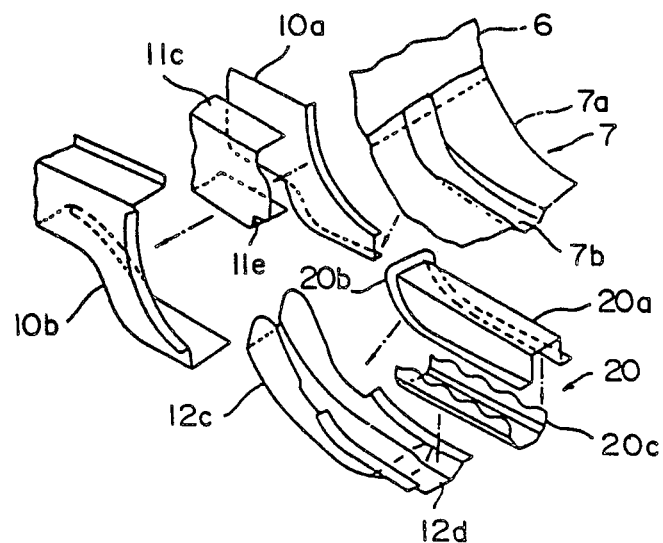
FIG. 3 is an exploded, perspective view of the front side frame shown in FIG. 2.

Both the kick-down front side frame 10 and the floor frame 20 are formed as cross-sectionally box-shaped hollow channels. These channel frames 10 and 20 are provided with reinforcement members disposed therein and extending, in the lengthwise direction, over their lengths. As is shown in detail in FIGS. 2 and 3, the kick-down front side frame 10 is constituted by four frame members. More specifically, the kick-down front side frame includes an outer front frame member 10a, an inner front frame member 10b, a front frame reinforcement 11c and a kick-down frame reinforcement 12c. The outer front frame member 10a has a flat portion, constituting an outer wall of the straight frame portion 11, and a U-channel portion, opening to the outside of the kick-down front side frame 10, constituting an outer wall of the kick-down frame portion 12. The inner front frame member 10b has a U-channel portion, opening to the outside of the front side frame 10, constituting an inner wall of the straight frame portion 11, and an L-shaped portion, constituting an inner wall of the kick-down frame portion 12. The front frame reinforcement 11c, for reinforcing the straight frame portion 11, has a U-channel shape opening to the outside of the kick-down front side frame 10. Finally, the kick-down frame reinforcement 12c, for reinforcing the kick-down frame portion 12, has a U-channel shape opening upward of the kick-down front side frame 10.

Figure 5A:
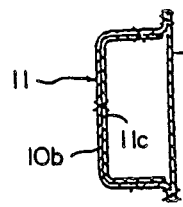
FIG. 5(A) is a cross-sectional view of FIG. 4, as seen along section line A—A.
Figure 5B:
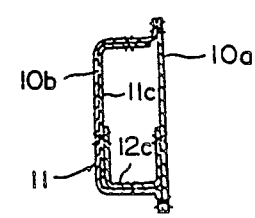
FIG. 5(B) is a cross-sectional view of FIG. 4, as seen along section line B—B.

After welding or otherwise securing the front frame reinforcement 11c to the inner front frame member 10b, the straight frame portion 11 of the kick-down front side frame 10 is formed by welding or otherwise securing the outer and inner frame members 10a and 10b to each other as shown in FIG. 5(A). At the transitional portion of the kick-down front side frame 10, between the straight frame portion 11 and the kick-down frame portion 12, as is shown in FIG. 5(B), the front frame reinforcement 11c and the kick-down frame reinforcement 12c are welded or otherwise secured to each other at their rear and front ends, respectively.

Figure 5C:
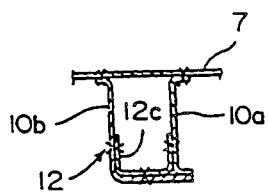
FIG. 5(C) is a cross-sectional view of FIG. 4, as seen along section line C—C.

As is shown in FIG. 5(C), at the kick-down frame portion 12, the outer and inner frame members 10a and 10b are welded or otherwise secured to each other so as to form the U-channel shape opening upward of the kick-down front side frame 10. After disposing the kick-down frame reinforcement 12c in the U-channel shaped kick-down frame portion 12 of the kick-down front side frame 10 and welding or otherwise securing it to the bottom of the U-channel shaped kick-down frame portion 12, the kick-down frame portion 12 of the kick-down front side frame 10 is welded or otherwise secured to an under surface of the floor panel 7 so as to close the upper opening of the U-channel shaped kick-down frame portion 12. It is preferred to provide the floor panel 7 with a sloped front end portion 7a, which has previously been trimmed so as to fit the slope of the kick-down frame portion 12. The front end portion 7a of the floor panel 7 is formed with a pair, i.e., right and left, sloped recesses 7b, each fitted with a sloped U-channel floor frame member 20a opening downward.

Figure 5D:
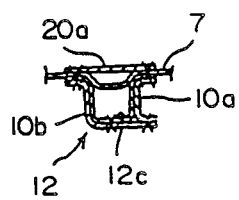
FIG. 5(D) is a cross-sectional view of FIG. 4, as seen along section line D—D.
Figure 5E:
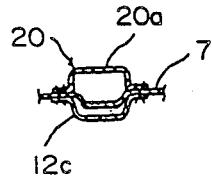
FIG. 5(E) is a cross-sectional view of FIG. 4, as seen along section line E—E.
Figure 5F:
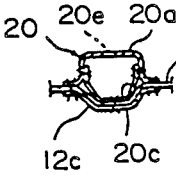
FIG. 5(F) is a cross-sectional view of FIG. 4, as seen along section line F—F.
Figure 5G:
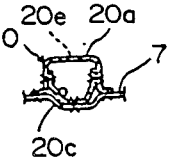
FIG. 5(G) is a cross-sectional view of FIG. 4, as seen along section line G—G.

The floor frame 20, as is shown in FIG. 5(G), is formed by locating the U-channel floor frame member 20a over the sloped recess 7b of the floor panel 7 and welding, or otherwise securing, the member 20a to the floor panel 7 so as to provide a cross-sectionally box-shaped hollow frame portion on the floor panel 7. In the hollow center space of the cross-sectionally box-shaped hollow frame portion of the floor frame 20, there is disposed a generally U-shaped floor frame reinforcement 20c, opening upward, which is welded or otherwise secured to the floor frame member 20a. A rear frame extension 12d of the kick-down frame reinforcement 12c is overlapped with the sloped front frame extension 20b of the floor frame 20, with the sloped recess 7b of the floor panel 7 interposed therebetween.

As is shown in FIG. 5(D), at the transitional portion from the kick-down frame portion 12 to the floor frame 20, the floor frame 20 is welded or otherwise secured, over the sloped front frame extension 20b, to an upper surface of the floor panel 7, having a sloped front end portion 7a which is secured to the kick-down frame portion 12. The floor frame 20 is further welded or otherwise secured, at a portion thereof adjacent to the sloped front end portion 7a, to the kick-down frame reinforcement 12c. In this way, the transitional portion from the kick-down frame portion 12 to the floor frame 20 is provided with a double walled, cross-sectionally box-shaped hollow frame so as to contribute to and, therefore, improve the structural rigidity of the transitional portion. As is shown in FIG. 5(F), the kick-down frame reinforcement 12c is welded or otherwise secured, at its rear end near a front end of the floor frame reinforcement 20c, to the under surface of the floor frame member 20a of the floor frame 20, so as thereby to interconnect the kick-down frame reinforcement 12c and the floor frame reinforcement 20c with the floor panel 7 interposed therebetween. An inner surface of each side wall of the floor frame member 20a of the floor frame 20 is welded or otherwise secured to the outer surface of each side wall of the U-shaped floor frame reinforcement 20c.

The dash panel 6 has a lower end portion 6a sloping rearwardly and down so as to fit the slope of the upper surface of the floor panel 7. The dash panel 6 is, at a part just above the lower end portion 6a, abutted against the rear end of the straight frame portion 11 of the front side frame 10 and welded or otherwise secured to the portion 11. The dash panel 6 is, further, overlapped with the front end of the floor panel 7 along the lower edge of the lower end portion 6a, and is welded or otherwise secured to the same.

As is shown in FIGS. 5(F) and 5(G), the floor frame member 20a is formed with access holes 20e disposed at several points in a straight line for making it easy to spot weld the floor panel 7 and the floor frame reinforcement 20c to the kick-down frame reinforcement 12c.

The structure of the floor frame 20 described above has various advantages as compared to a conventional floor frame which is generally secured to an under surface of a flat floor panel only. Specifically, because the floor frame member 20a of the floor frame 20 receives the recess 7b of the floor panel 7 with the upper half of the floor frame member 20a projecting above the upper surface of the floor panel 7, the underside of the floor panel 7 can be made more flat than the underside of a conventional floor. Furthermore, because the floor frame member 20a is welded not only to the upper surface of the floor panel 7 but also to the side walls of the U-shaped floor frame reinforcement 20c, the floor frame 20 has a structural strength and a rigidity higher than those of the conventional floor. These advantages help to greatly reduce, or dissipate, a high impact applied to the compartment during a collision.

Figure 6:
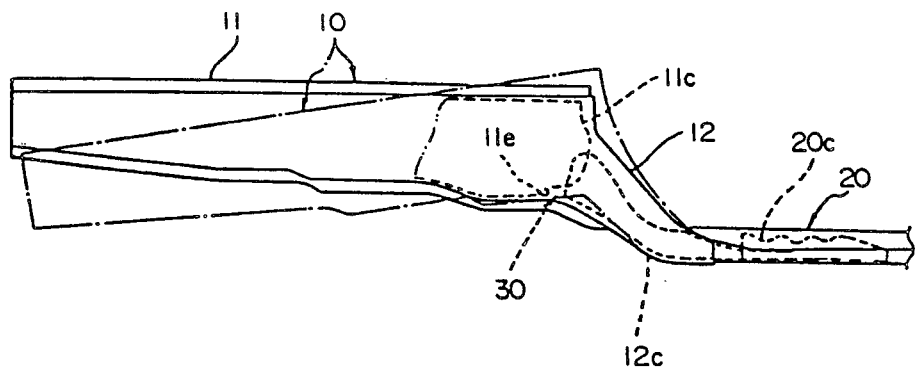
FIG. 6 is a side view of the front side frame after deformation of the front body.

In the front body section of the present invention, adjustment of the deformation of the kick-down front side frame 10, caused upon the occurrence of a collision, to a desired pattern, i.e., adjustment of the deformation mode, is achieved by providing the reinforcement, constituted by the front frame reinforcement 11c and the kick-down frame reinforcement 12c, with a structure forming crushable means 30, having the form of a kerf or notch, near a transitional portion between the straight front frame portion 11 and the kick-down frame portion 12. That is, as is shown in FIG. 6, the crushable means 30 is provided by cutting off a lower rear end of the front frame reinforcement 11c and welding or otherwise securing the rear end of the front frame reinforcement 11c to the front end of the kick-down frame reinforcement 12c so as to form a kerf or notch 11e, opening downward, between the two reinforcement 11c and 12c.

When the kick-down structure and the cushioning space 30 of the front side frame 10 is used, if the front side frame 10 receives a high impact load in the lengthwise direction upon a collision, the front side frame 10 causes the floor panel 7 to bend upward along a line in which the rear edge of the kick-down frame reinforcement 12c is located, so that the floor panel is allowed to bend upwardly and back. Simultaneously, because the cushioning space 30 is provided between the front frame reinforcement 11c and the kick-down frame reinforcement 12c, which are connected to each other, the straight frame portion 11 bends down with respect to a plane in which it is located before the occurrence of the collision relative to the kick-down frame portion 12. As a result, the front side frame 10 deforms as shown by a dotted line in FIG. 6, and pushes upward the end of the straight frame portion 11. This deformation moves upward the dash panel 6, and hence the cowl box 16. The upward movement of the cowl box 16 prevents the front header 18 from coming down, so that the driver and/or passengers in the front compartment of the vehicle do not hit their heads against the front header 18.

At this time, because the floor frame reinforcement 20c, connected to the side walls of the floor frame member 20a, is connected to the rear end of the kick-down frame reinforcement 12c near the front side of the floor frame 20 (see FIG. 5(F)), the front portion of the floor frame 20 is particularly reinforced and has a high structural rigidity, so that the deformation of the front compartment of the vehicle is kept to a minimum upon the occurrence of a collision. Additionally, because the kick-down frame portion 12 is firmly supported at its rear end, the desirably patterned deformation of the front side frame 10 is developed upon the occurrence of a collision.

If the engine and/or a cross beam (not shown) for supporting suspensions are forced backward by the deformation of the front side frame 10 upon the occurrence of a collision, the cross beam is forced to move into the cushioning space 30 and, thereby, the front side frame 10 is certain to be bent at the location of crushable means 30, so as to contribute to realizing the desirably patterned deformation of the front side frame 10.

Figure 7:
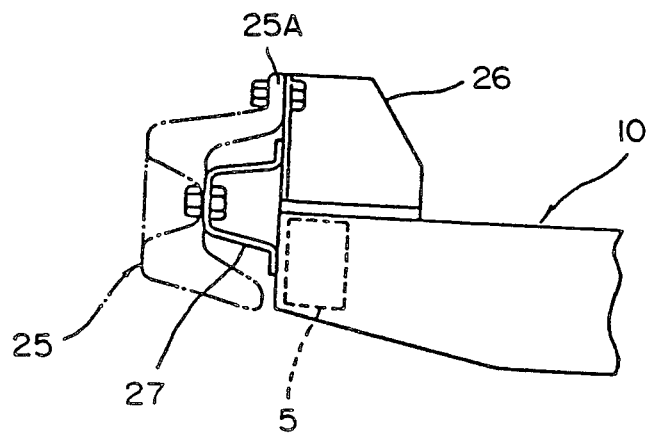
FIG. 7 is a side view of the front portion of the front side frame to which a front bumper is attached.

It is desirable to improve the shock absorbing characteristics of a front bumper secured to the front ends of the front side frames. Consequently, as is shown in FIG. 7, the front side frame 10 is attached to a bumper bracket 26, which is welded or otherwise secured to the upper surface of the front end thereof. The front side frame 10 is further attached to a cushioning member 27, formed as a generally U-shaped channel, welded or otherwise secured to the front end surfaces of the bumper bracket 26 and the front side frame 10. A front bumper 25, having a generally U-shaped cross section and formed with an upper flange 25A, is bolted to both the bumper bracket 26 and the cushioning member 27 at each end of the front bumper.

Figure 8:
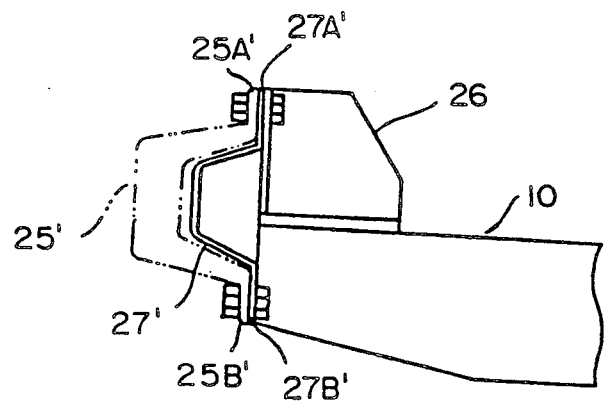
FIG. 8 is a side view of an alternative structure of the front portion of the front side frame.

FIG. 8 shows an alternative front bumper fitting structure including a cushioning member 27' formed in a generally U-shaped channel and with upper and lower flanges 27A' and 27B'. A front bumper 25', having a generally U-shaped cross section and formed with upper and lower flanges 25A' and 25B', is bolted to the front ends of the bumper bracket 26 and the front side frame 10 at each end thereof. The cushioning member 27' is held between the upper and lower flanges of the front bumper 25' and the front ends of the bumper bracket 26 and the front side frame 10, with the upper flange 27A' inserted between the upper flange 25A' of the front bumper 25' and the bumper bracket 26, and the lower flange 27B' inserted between the lower flange 25B' of the front bumper 25' and the front side frame 10.

It is to be understood that although the invention has been described in detail with respect to a preferred embodiment thereof, various other embodiments and variants are possible which fall within the spirit and scope of the invention, and such embodiments and variants are intended to be covered by the following claims.

What is claimed is:

1. A front body section of a vehicle including a dash panel, over which a front windshield glass is disposed, a cowl box placed over the dash panel for supporting the front windshield glass, a front header, and a floor panel in a passenger compartment of the vehicle, said front body section comprising:

a pair of generally box-channel shaped kick-down front side frames, each extending in a lengthwise direction, from front to back, of the vehicle, each kick-down front side frame including a straight front frame portion extending substantially straight back and kick-down frame portion curving downwardly and back from the straight front frame portion, said dash panel being secured, at a lower end portion thereof, to a rear end of said straight front frame portion thereof, to a rear end of said straight front frame portion and partitioning an engine room from the passenger compartment of the vehicle;

a pair of floor frames, one of said floor frame being connected to each of said pair of generally box-channel shaped kick-down front side frames, each floor frame extending in the lengthwise direction and being received in a recess formed in the floor panel, a portion of each of the floor frame projecting above an upper surface of the floor panel;

a front frame reinforcement placed within and extending in the lengthwise direction of the straight front frame portion of each said kick-down front side frame; and a kick-down frame reinforcement disposed in the kick-down frame portion of each said kick-down front side frame, said front frame reinforcement and said kick-down frame reinforcement being secured to each other at their rear and front ends, respectively, at a transitional portion of each kick-down front side frame, each said transitional portion including a notch provided at a lower part of one of the front frame reinforcement and the kick-down frame reinforcement so that each kick-down front side frame is crushed at said transitional portion during a collision of the vehicle and said dash panel and said front header are pushed upward.

2. A front body section as defined in claim 1, wherein said notch is provided in said front frame reinforcement.

3. A front body section as defined in claim 1, and further comprising a front bumper secured to a front end of each of said kick-down front side frames and a cushioning member disposed between said front bumper and each of said kick-down front side frames.

4. A front body section as defined in claim 3, wherein said cushioning member has, generally, a U-shape.

5. A front body section as defined in claim 1, and further comprising a floor frame reinforcement secured to said portion of each of the floor frames, said portion of each of the floor frames being secured to both the upper surface of the floor panel and to one of the floor frame reinforcements.

* * * * *